(12) United States Patent
Yi et al.

(10) Patent No.: US 9,985,543 B1
(45) Date of Patent: May 29, 2018

(54) SWITCHING POWER SUPPLY

(71) Applicant: SUZHOU POWERON IC DESIGN CO., LTD., Suzhou, Jiangsu (CN)

(72) Inventors: Yangbo Yi, Jiangsu (CN); Haisong Li, Jiangsu (CN); Changshen Zhao, Jiangsu (CN); Wenliang Liu, Jiangsu (CN); Ping Tao, Jiangsu (CN)

(73) Assignee: SUZHOU POWERON IC DESIGN CO., LTD., Suzhou (CN)

( * ) Notice: Subject to any disclaimer, the term of this patent is extended or adjusted under 35 U.S.C. 154(b) by 0 days. days.

(21) Appl. No.: 15/632,129

(22) Filed: Jun. 23, 2017

(30) Foreign Application Priority Data

Apr. 7, 2017 (CN) .......................... 2017 1 0223574

(51) Int. Cl.
| | |
|---|---|
| *H02M 3/335* | (2006.01) |
| *H02H 7/12* | (2006.01) |
| *H02M 3/24* | (2006.01) |
| *H02M 1/34* | (2007.01) |

(52) U.S. Cl.
CPC .......... *H02M 3/33553* (2013.01); *H02H 7/12* (2013.01); *H02M 3/24* (2013.01); *H02M 3/33592* (2013.01); *H02M 3/33523* (2013.01); *H02M 2001/342* (2013.01)

(58) Field of Classification Search
CPC ............... H02M 3/24; H02M 3/33507; H02M 3/33523; H02M 3/33546; H02M 3/33553; H02M 1/36; H02M 2001/32
See application file for complete search history.

(56) References Cited

U.S. PATENT DOCUMENTS

| | | | | |
|---|---|---|---|---|
| 7,035,119 B2* | 4/2006 | Koike | ............... | H02M 3/33523 363/19 |
| 8,742,693 B2* | 6/2014 | Ikeda | ........................ | G05F 1/44 315/254 |
| 2014/0312684 A1* | 10/2014 | Sawada | ............. | H02M 3/33523 307/9.1 |
| 2016/0359419 A1* | 12/2016 | Lin | ........................ | H02M 1/08 |

\* cited by examiner

*Primary Examiner* — Matthew Nguyen
(74) *Attorney, Agent, or Firm* — Fenwick & West LLP

(57) ABSTRACT

A switching power supply is provided which includes: an output port; a transformer; a first voltage divider circuit, configured to divide a feedback voltage to obtain a first divided voltage; and a primary controller, configured to control a current of the primary winding of the transformer; where the primary controller includes: a first comparison module, configured to compare the first divided voltage with a first reference voltage to obtain a first comparison result; a second comparison module, configured to compare the power supply voltage with a second reference voltage to obtain a second comparison result; and an open circuit protection module, configured to generate an open circuit protection signal, where the primary controller is configured to stop control of the primary winding in response to the open circuit protection signal. The present disclosure can efficiently detect disconnection of the up-sampling resistor of the switching power supply and provide open-circuit protection.

10 Claims, 11 Drawing Sheets

SWITCHING POWER SUPPLY

CROSS-REFERENCE TO RELATED APPLICATIONS

This application claims the benefit of priority to Chinese Patent Application No. 201710223574.9, titled "SWITCHING POWER SUPPLY", filed on Apr. 7, 2017, the entire disclosure of which is incorporated herein by reference.

TECHNICAL FIELD

The present disclosure generally relates to switching power supply technology field, and more particularly, to a switching power supply.

BACKGROUND

Switching power supply is to maintain a stable output voltage by controlling a time ratio of turn-on and turn-off of a switch tube using a modern power electronics technology. Nowadays, the switching power supply is widely applied to almost all of the electronic equipments due to its advantage of small, lightweight and high efficiency, and becomes an indispensable power supply for the rapid development of the current electronic information industry.

FIG. 1 schematically illustrates a structural block diagram of a typical switching power supply in a conventional technology. As shown in FIG. 1, the switching power supply 100 may include at least an output port (not shown), a rectifier circuit 101, a filter circuit 102, a transformer T1, a capacitor C1, a load R1, a primary controller 103, and a first voltage divider circuit comprised of an up-sampling resistor R_U and a down sampling resistance R_D. The output port is configured to generate an output voltage Vout, and may be coupled with a capacitor C1 and a load R1 which are configured to filter out ripple of the output voltage Vout. An Alternating Current (AC) input signal Vin is transmitted to a primary winding n1 of the transformer T1 via a rectification of the rectification circuit 101 and a filtering of the filter circuit 102, and the secondary winding n2 of the transformer T1 is coupled with the output port. An auxiliary winding n3 of the transformer T1 outputs a feedback voltage V_AUX, and the first voltage divider circuit is configured to divide the feedback voltage V_AUX to obtain a first divided voltage FB. The primary controller 103 has a feedback port (not shown) and a power supply port (not shown), where the feedback port is configured to be input with the first divided voltage FB, the power supply port is configured to be input with a power supply voltage VDD, and the power supply voltage VDD supplies power to the primary controller 103.

A negative feedback is formed, due to the first divided voltage FB input in the feedback port reflecting a change of the output voltage Vout in real time. The primary controller 103 may control a current of the primary winding n1 of the transformer T1 according to the first divided voltage FB to indirectly control a current of the secondary winding n2 of the transformer T1 that is coupled, thereby controlling a magnitude of the output voltage Vout. Specifically, it can be achieved by controlling a duty cycle of a Pulse Width Modulation (PWM) signal generated by the primary controller 103. The transformer T1 starts to store energy when the current of the primary winding n1 of the transformer T1 increases, and the current coupled to the secondary winding n2 will continue to be transmitted to the output port when the current of the primary winding n1 is turned off. When the current of the primary winding n1 is turned off, a dissipation process of electrical energy coupled to the secondary winding n2 takes places. Such dissipation process is commonly referred to as a demagnetization process of the secondary winding n2, and a duration of the demagnetization process is referred to as a demagnetization time. Normally, the primary controller 103 may monitor the demagnetization time of the secondary winding n2 by monitoring a waveform of the first divided voltage FB.

The up-sampling resistor R_U may be disconnected for various reasons. Since one end of the up-sampling resistor R_U is normally grounded through the down sampling resistance R_D, when the up-sampling resistor R_U is disconnected, the first divided voltage FB approaches a zero potential, the negative feedback path is disconnected, the demagnetization time and the output voltage Vout of the secondary winding n2 cannot be accurately detected, and the switching power supply 100 is in an open loop state. In this situation, potential of the output voltage Vout and potential of the power supply voltage VDD will still be continuously increased. At this time, appropriate measures should be taken to protect the switching power supply 100.

There are two methods for detecting disconnection of the aforementioned up-sampling resistor R_U in the conventional technology. One detection method is to detect the power supply voltage VDD, i.e., if the VDD exceeds the overvoltage protection threshold of the power supply port, then it is determined that the up-sampling resistor R_U is open. This detection method has a disadvantage that the detection may be not in time, i.e., when the power supply voltage VDD exceeds the overvoltage protection threshold, an actual value of the output voltage Vout may have already exceeded the maximum allowable voltage of the capacitor C1 or the load R1, which may make the capacitor C1 or the load R1 burned down. The other detection method is to detect the demagnetization time of the secondary winding n2 through the first divided voltage FB, i.e., if the demagnetization time is less than a certain time threshold, then it is determined that the up-sampling resistor R_U is open. This detection method has a disadvantage that the first divided voltage FB may not be constantly zero potential due to a voltage coupling phenomenon, which makes the primary controller 103 still capable of detecting a demagnetization time greater than the certain time threshold, thereby resulting in a misjudgment.

Therefore, there is a disadvantage in the conventional technology that the detection of the disconnection of the up-sampling resistor of the switching power supply is not timely or is prone to causing a misjudgment.

SUMMARY

The technical problem solved by the present disclosure is how to effectively detect disconnection of an up-sampling resistor of a switching power supply and provide an open circuit protection.

In order to solve the above technical problem, a switching power supply is provided according to an embodiment of the present disclosure. The switching power supply includes: an output port, configured to generate an output voltage; a transformer, including a primary winding configured to receive an input signal directly or indirectly, and a secondary winding coupled with the output port; a first voltage divider circuit, configured to divide a feedback voltage to obtain a first divided voltage, the feedback voltage being correlated with the output voltage; and a primary controller, configured to control a current of the primary winding of the transformer, the primary controller having a feedback port and a power supply port, the feedback port being configured to be input with the first divided voltage, the power supply port being configured to be input with a power supply voltage; wherein, the primary controller includes: a first comparison module, configured to compare the first divided voltage with a first reference voltage to obtain a first comparison result; a second comparison module, configured to compare the power supply voltage with a second reference voltage to obtain a second comparison result; and an open circuit protection module, configured to generate an open circuit protection signal, when the first comparison result indicates that the first divided voltage is lower than the first reference voltage, and the second comparison result indicates that the power supply voltage is higher than the second reference voltage, where the primary controller is configured to stop a control of the primary winding in response to the open circuit protection signal.

Optionally, the transformer includes an auxiliary winding, and the auxiliary winding outputs the feedback voltage; and the first reference voltage is smaller than a constant voltage reference value, and the constant voltage reference value is equal to a product of a turns ratio of the auxiliary winding and the secondary winding, a rated output voltage of the switching power supply and a voltage division ratio of the first voltage divider circuit.

Optionally, the first comparison module includes: a sample and hold module, configured to sample and hold the first divided voltage within a demagnetization time of the secondary winding to obtain a sampling voltage; and a first comparator, coupled with the sample and hold module, and configured to compare the sampling voltage with the first reference voltage to obtain the first comparison result.

Optionally, the open circuit protection module includes: a logic module, having a first input terminal input with the first comparison result and a second input terminal input with the second comparison result, the logic module being configured to generate a logic signal when the first comparison result indicates that the first divided voltage is lower than the first reference voltage, and the second comparison result indicates that the power supply voltage is higher than the second reference voltage; and a first timing module, configured to start timing under a control of the logic signal and to generate the open circuit protection signal when the timing lasts for a period greater than or equal to a first time length.

Optionally, the first comparison result is a logic high level when the first divided voltage is less than the first reference voltage, and the second comparison result is a logic high level when the power supply voltage is greater than the second reference voltage; and the logic module includes an AND gate, where the AND gate has a first input terminal input with the first comparison result, a second input terminal input with the second comparison result, and an output terminal outputting the logic signal.

Optionally, the second comparison module includes: a second voltage divider circuit, configured to divide the power supply voltage to obtain a second divided voltage; and a second comparator, configured to compare the second divided voltage with a reference divider voltage to obtain the second comparison result, where the reference divider voltage is equal to the second reference voltage multiplied by a voltage division ratio of the second voltage divider circuit.

Optionally, the primary controller further includes: a third comparison module, configured to compare the second divided voltage with a third reference voltage to obtain a third comparison result, where the third reference voltage is less than the reference divider voltage; and a second timing module, input with the third comparison result, and configured to start timing when the third comparison result indicates that the second divided voltage is greater than the third reference voltage, and to stop timing when the timing lasts for a period of a second time length so as to generate a time window signal; and the open circuit protection module includes: a logic module, having a first input terminal input with the first comparison result, a second input terminal input with the second comparison result, and a third input terminal input with the time window signal, where the third input terminal is configured to generate a logic signal in a time window defined by the time window signal, when the first comparison result indicates that the first divided voltage is lower than the first reference voltage, and the second comparison result indicates that the second divided voltage is higher than the reference divider voltage; and a first timing module, configured to start timing under a control of the logic signal, and to generate the open circuit protection signal when the timing lasts for a period greater than or equal to a first time length.

Optionally, the primary controller further includes: a high voltage startup module, having a control terminal input with the third comparison result, and an output terminal coupled with a power supply port, where the high voltage startup module is configured to charge the power supply port, when the third comparison result indicates that the second divided voltage is less than or equal to the third reference voltage, and the high voltage startup module is configured to stop charging the power supply port, when the third comparison result indicates that the second divided voltage is greater than the third reference voltage.

Optionally, the first comparison result is a logic high level when the first divided voltage is less than the first reference voltage, the second comparison result is a logic high level when the second divided voltage is greater than the reference divider voltage, and the time window signal is a logic high level during the timing of the second timing module; and the logic module includes an AND gate, where the AND gate has a first input terminal input with the first comparison result, a second input terminal input with the second comparison result, a third input terminal input with the time window signal, and an output terminal outputting the logic signal.

Optionally, the second reference voltage is set to make that: the output voltage is less than a maximum allowable voltage of the output port when the power supply voltage is equal to the second reference voltage, where the maximum allowable voltage of the output port is a maximum allowable voltage of a capacitance or a load coupled with the output port.

Compared with a conventional technology, the present disclosure has the following beneficial effects.

The switching power supply according to embodiments of the present disclosure may include an output port, a transformer, a first voltage divider circuit, and a primary controller. Where the primary controller may include: a first comparison module, configured to compare the first divided voltage with a first reference voltage to obtain a first comparison result; a second comparison module, configured to compare the power supply voltage with a second reference voltage to obtain a second comparison result; and an open circuit protection module, configured to generate an open circuit protection signal, when the first comparison result indicates that the first divided voltage is lower than the first reference voltage, and the second comparison result indicates that the power supply voltage is higher than the second reference voltage, where the primary controller is configured to stop a control of the primary winding in response to the open circuit protection signal. In the present disclosure, the disconnection of the up-sampling resistor is determined based on two criteria that the first divided voltage is lower than the first reference voltage and that the power supply voltage is higher than the second reference voltage, which is less prone to making a false judgment and the detection method is more effective, therefore the open circuit protection will be provided more effectively to the switching power supply.

Further, the second reference voltage is set to make that: the output voltage is less than a maximum allowable voltage of the output port when the power supply voltage is equal to the second reference voltage, where the maximum allowable voltage of the output port is a maximum allowable voltage of a capacitance or a load coupled to the output port. Therefore, it is possible to detect the disconnection of the up-sampling resistor timely and the output voltage will not be too high to increase the risk of damaging the capacitor or the load.

Further, the open circuit protection module may include: a logic module, configured to generate a logic signal when the first comparison result indicates that the first divided voltage is lower than the first reference voltage, and the second comparison result indicates that the power supply voltage is higher than the second reference voltage; and a first timing module, configured to start timing under a control of the logic signal and to generate the open circuit protection signal when the timing lasts for a period greater than or equal to a first time length. It is determined that the up-sampling resistor is open if and only if the first divided voltage is lower than the first reference voltage, the power supply voltage is higher than the second reference voltage and the timing lasts for at least a first time length, which is beneficial to filtering out signal burrs caused by the power supply voltage being accidentally too high or the first divided voltage being accidentally too low, so as to avoid misjudgment.

Further, the second comparison module may include a second voltage divider circuit and a second comparator, and the primary controller may further include a third comparison module and a second timing module, so that the disconnection detection of the up-sampling resistor is performed when the switching power supply has just entered a normal working condition, and the disconnection detection only occurs in a certain time window, which may facilitate saving power consumption of the switching power supply.

DETAILED DESCRIPTION

As described in the background, there is drawback in the conventional technology that the disconnection detection of the up-sampling resistor of the switching power supply is not timely or is prone to making a false judgment.

Inventors of the present application have further analyzed the two detection methods in the conventional technology.

Figure 1:
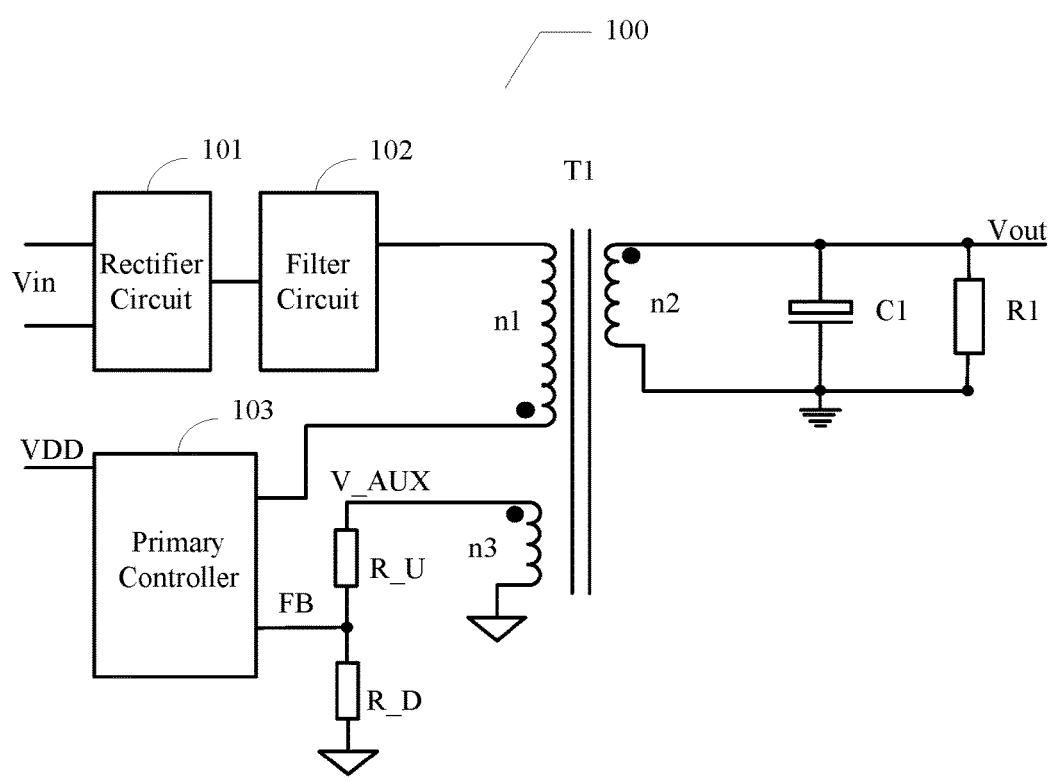
FIG. 1 schematically illustrates a structural block diagram of a switching power supply in a conventional technology.
Figure 2:
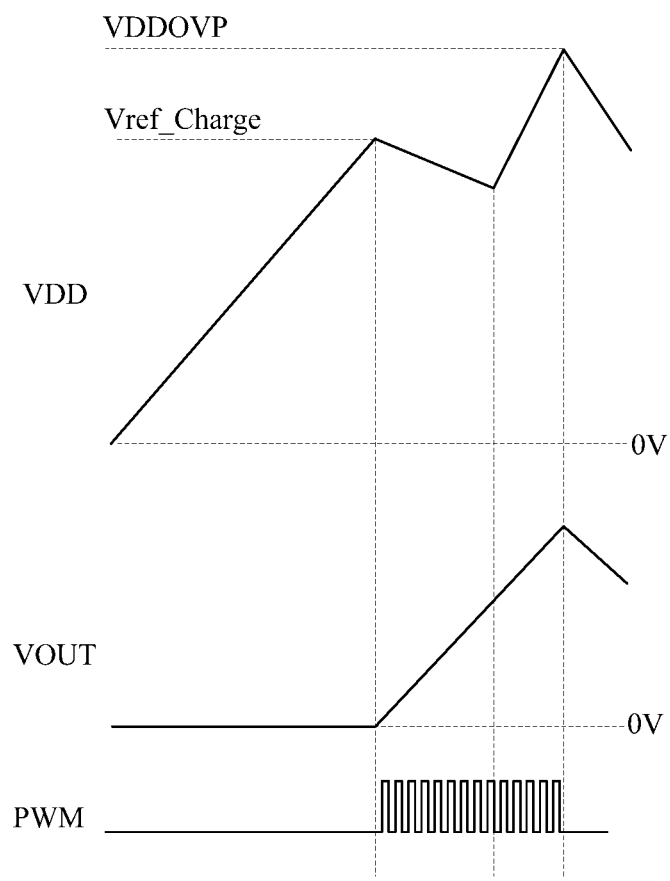
FIG. 2 schematically illustrates a work waveform diagram of the switching power supply shown in FIG. 1.

Referring to FIGS. 1 and 2, where FIG. 2 schematically illustrates a work waveform diagram of the power supply voltage VDD, the output voltage Vout and the PWM signal during a start-up phase of the switching power supply 100. When the switching power supply 100 starts to operate, the power supply voltage VDD continuously goes up since the power supply port is charged, when the power supply voltage VDD rises to a voltage reference value of Vref_Charge, the primary controller 103 generates a PWM signal so that the output voltage Vout rises. If the up-sampling resistor R_U is open, the power supply voltage VDD will exceed an overvoltage protection threshold VDDOVP of the power supply port, then it is determined that the up-sampling resistor R_U is open. Assuming that the auxiliary winding n3 and the secondary winding n2 of the transformer T1 respectively have a number of turns of NA and NS, and assuming that a rated output voltage of the switching power supply 100, that is, the output voltage Vout under a normal circumstance, is 5V, it follows that NA/NS=3. The feedback port and the power supply port are generally coupled directly or indirectly, then it can be derived: VDD=FB×(R_U+R_D)/R_D≈NA/NS×Vout=7.5V. Actually, the primary controller 103 itself is provided with a monitoring mechanism for the power supply voltage VDD, and the overvoltage protection threshold VDDOVP is set with reference to a withstand voltage condition of the primary controller 103. Therefore, the overvoltage protection threshold VDDOVP is generally set to be 1.5 times the power supply voltage VDD under a normal condition, i.e. VDDOVP≈22.5V. That is, when it is detected that the power supply voltage VDD exceeds 22.5 V, and it is determined that the up-sampling resistor R_D is open, it can be inversely derived that the output voltage Vout is approximately 7.5 V. While when the switching power supply 100 generally has a rated output voltage of 5V, the capacitor C1 having a maximum allowable voltage of 6.2V will be correspondingly applied, which may lead to the capacitor C1 being burned down, and the output voltage Vout may also exceed the maximum allowable voltage of the load R1.

Figure 3:
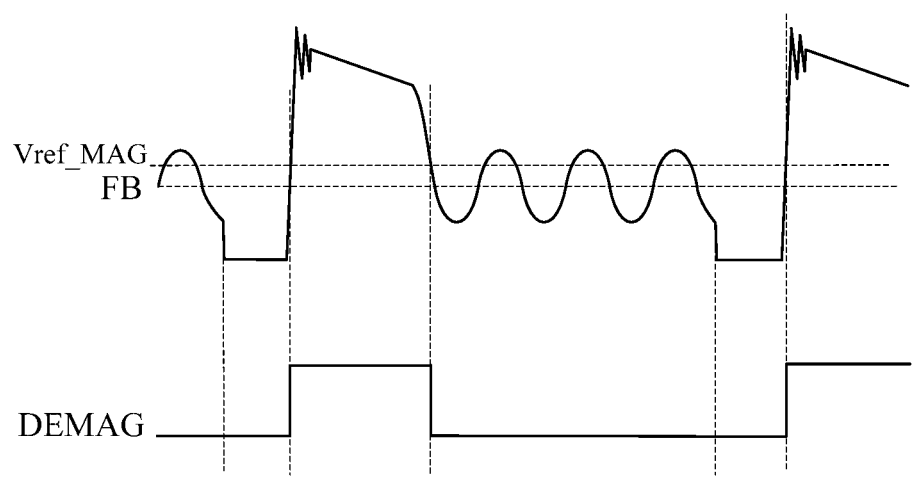
FIG. 3 schematically illustrates a waveform diagram of a demagnetization time and a demagnetization signal of the switching power supply shown in FIG. 1 in normal operation.
Figure 4:
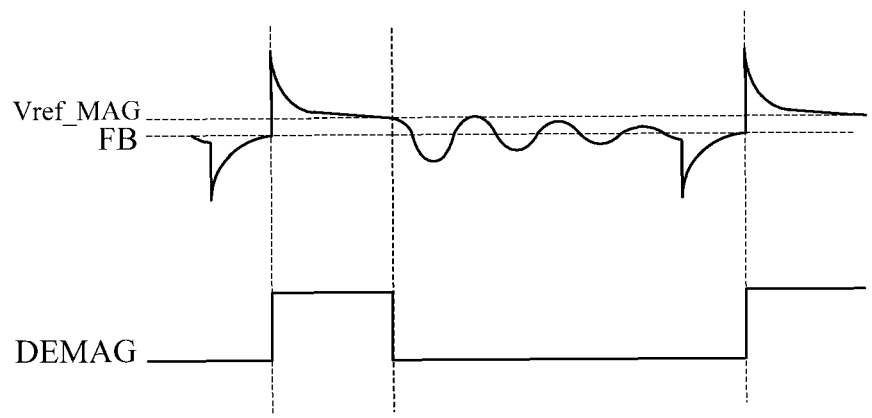
FIG. 4 schematically illustrates a waveform diagram of a demagnetization time and a demagnetization signal of the switching power supply shown in FIG. 1 when the up-sampling resistor is open.

Referring to FIG. 1 in conjunction with FIGS. 3 and 4, FIG. 3 schematically illustrates a work waveform of the first divided voltage FB under a normal condition. In some embodiments, a detection method may include: comparing the first divided voltage FB and a reference voltage Vref_MAG using a comparator; generating a demagnetization signal DEMAG based on a portion of the first divided voltage FB exceeding the reference voltage Vref_MAG; detecting a pulse width of the demagnetization signal DEMAG, and comparing the pulse width with a time threshold; if the pulse width is greater than or equal to the time threshold, then it is determined that the up-sampling resistor R_U is not open, otherwise it is determined that the up-sampling resistor R_U is open. FIG. 4 schematically illustrates a waveform diagram of the first divided voltage FB when the up-sampling resistor R_U is open. It can be seen that, the first divided voltage FB is not constantly zero potential and has spikes due to parasitic capacitance or noise interference, therefore the first divided voltage FB may exceed the reference voltage Vref_MAG, and a pulse width of the demagnetization signal DEMAG may be greater than or equal to the time threshold, resulting in misjudgment.

Therefore, there are disadvantages in the aforementioned two detection methods respectively that the detection is not timely and easy to make a false judgment.

A switching power supply and a primary controller are provided in the present disclosure. Disconnection of the up-sampling resistor of the switching power supply can be efficiently detected by simultaneously detecting whether a power supply port voltage is too high and whether a feedback port voltage is too low using the primary controller. The detection is timely and not prone to making a false judgment, thereby overcoming the disadvantages in the conventional technology.

The foregoing objects, features and advantages of the present invention will become more apparent from the following detailed description of specific embodiments of the invention taken in conjunction with the accompanying drawings.

Figure 5:
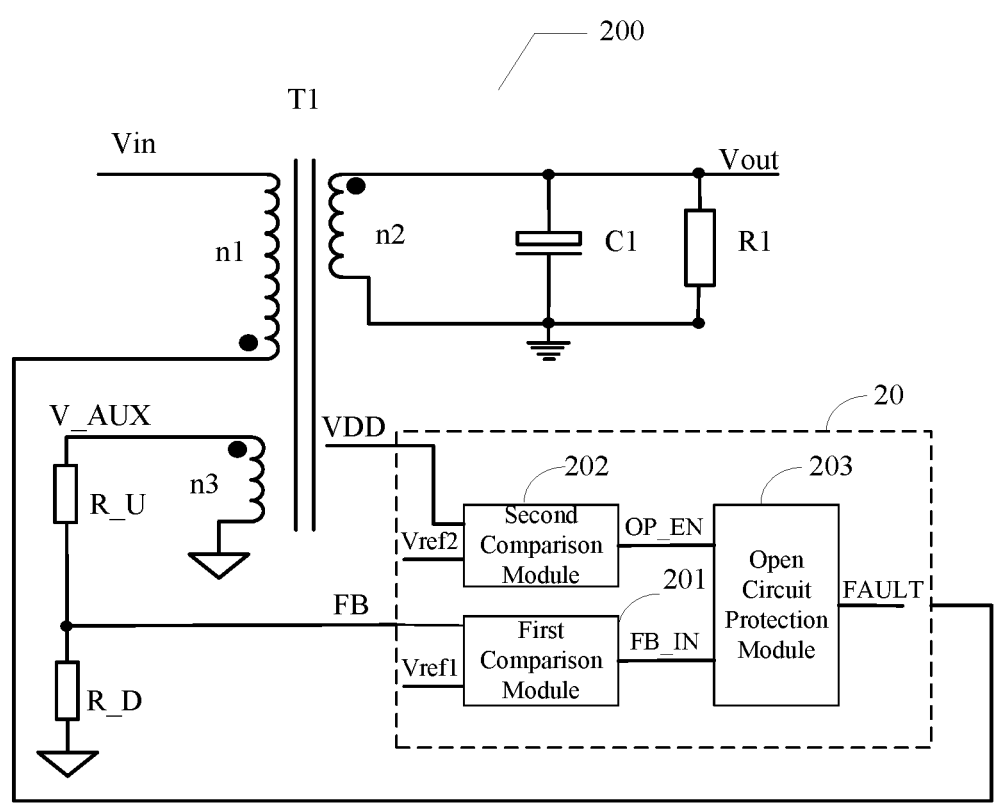
FIG. 5 schematically illustrates a structural block diagram of a switching power supply according to a first embodiment of the present disclosure.

According to a first embodiment of the present disclosure shown in FIG. 5, a switching power supply 200 may include an output port (not shown), a transformer T1, a first voltage divider circuit (not shown) and a primary controller 20.

The output port is configured to generate an output voltage Vout for supplying power to a load R1, and the load R1 may be any working circuit or electronic device.

The transformer T1 may include a primary winding n1 configured to receive an input signal Vin directly or indirectly. For example, the input signal Vin may be an Alternating Current (AC) signal input into the primary winding n1 after being rectified and filtered. And the transformer T1 may further include a secondary winding n2 coupled with the output port, where the secondary winding n2 is configured to periodically transmit power to the output port.

The first voltage divider circuit is configured to divide a feedback voltage V_AUX to obtain a first divided voltage FB, and the feedback voltage V_AUX is correlated with the output voltage Vout. Where the first voltage divider circuit may include an up-sampling resistor R_U and a down-sampling resistor R_D, one end of the up-sampling resistor R_U is connected with the feedback voltage V_AUX, the other end of the up-sampling resistor R_U is connected with one end of the down-sampling resistor, and the other end of the down-sampling resistor R_D is grounded.

In some embodiments, the transformer T1 may include an auxiliary winding n3, the feedback voltage V_AUX may be output from the auxiliary winding n3, i.e., the switching power supply 200 may use a primary feedback, but the present disclosure is not limited hereto. For example, the switching power supply 200 may also use other feedback paths (e.g., an impedance circuit) to obtain the feedback voltage V_AUX from the output port.

In some embodiments, the primary controller 20 may have a feedback port (not shown) and a power port (not shown). The feedback port is configured to be input with the first divided voltage FB, the power supply port is configured to be input with the power supply voltage VDD, and the power supply voltage VDD is configured to supply power to the primary controller 20. The primary controller 20 is configured to control a current of the primary winding n1 of the transformer T1 to indirectly control a current of the secondary winding n2 of the transformer T1 so as to control a magnitude of the output voltage Vout. Specifically, it can be realized by controlling a duty ratio of a Pulse Width Modulation (PWM) signal (not shown) generated by the primary controller 20 based on the first divided voltage FB.

The primary controller 20 may include a first comparison module 201, a second comparison module 202, and an open circuit protection module 203. Where the first comparison module 201 is configured to compare the first divided voltage FB with a first reference voltage Vref1 to obtain a first comparison result FB_IN. The second comparison module 202 is configured to compare the power supply voltage VDD with a second reference voltage Vref2 to obtain a second comparison result OP_EN.

Figure 6:
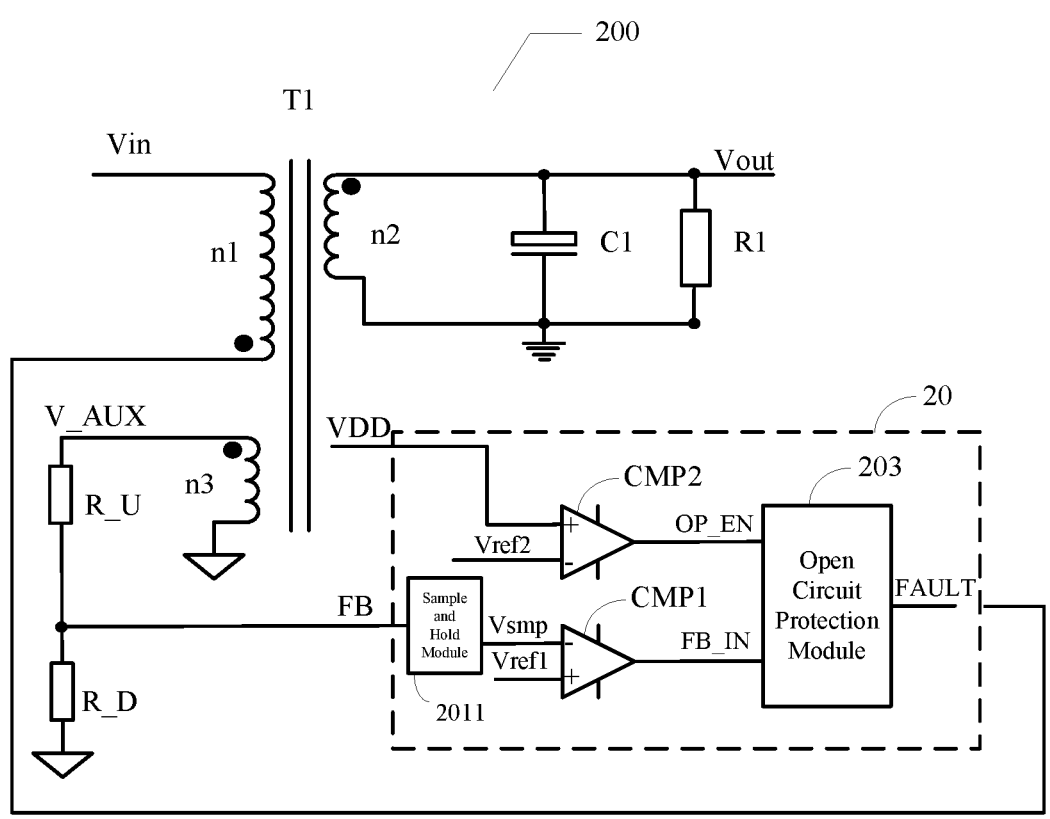
FIG. 6 schematically illustrates a structural block diagram of another switching power supply according to the first embodiment of the present disclosure.

Referring to FIGS. 5 and 6, in some embodiments, the first comparison module 201 may include a sample and hold module 2011 and a first comparator CMP1. For example, the first comparator CMP1 may be a voltage comparator.

The sample and hold module 2011 is configured to sample and hold the first divided voltage FB within a demagnetization time of the secondary winding n2 to obtain a sampling voltage Vsmp. In some embodiments, referring to the description of FIG. 3, by comparing the first divided voltage FB with the reference voltage, a demagnetization time of the secondary winding n2 may be determined based on a duration of a portion of the first divided voltage FB exceeding the reference voltage. How to determine a sample and hold time within the demagnetization time may depend on an the actual situation, and the present disclosure imposes no restriction on this.

The first comparator CMP1 is coupled with the sample and hold module 2011 and is configured to compare the sampling voltage Vsmp with the first reference voltage Vref1 to obtain the first comparison result FB_IN.

In some embodiments, the second comparison module 201 may also compare the power supply voltage VDD with the second reference voltage Vref2 using a second comparator CMP2.

In a variation of the present embodiment, the first comparison module 201 and/or the second comparison module 202 may include an Analog to Digital Converter (ADC, not shown) and an arithmetic device (not shown), that is, the first divided voltage FB and/or the power supply voltage VDD will be converted into digital signals, and compared with the first reference voltage Vref1 and/or the second reference voltage Vref2 respectively in the arithmetic device. In another variation of the present embodiment, the comparison between voltages may be converted to a comparison between frequencies by adopting a Voltage-Frequency Conversion (VFC) method, which will not be described in detail herein.

In some embodiments, the transformer T1 may include an auxiliary winding n3, the auxiliary winding n3 outputs the feedback voltage V_AUX, and the first reference voltage Vref1 is smaller than a constant voltage reference value, where the constant voltage reference value is equal to a product of a turns ratio of the auxiliary winding n3 and the secondary winding n2, a rated output voltage (such as 5V, 12V) of the switching power supply 200, and a voltage division ratio of the first voltage divider circuit. The voltage division ratio of the first voltage divider circuit depends on a resistance value of the up-sampling resistor R_U and a resistance value of the down-sampling resistor R_D. It should be understood that, the constant voltage reference value is set in accordance with an output voltage Vout of the switching power supply 200 in a rated state, and the first divided voltage FB is basically equal to the constant voltage reference value and greater than the first reference voltage Vref1. If the first divided voltage FB is smaller than the first reference voltage Vref1, then it indicates that an abnormality may occur, for example, the up-sampling resistor R_U is open.

When the first divided voltage FB is less than the first reference voltage Vref1 and the power supply voltage VDD is greater than the second reference voltage Vref2, it is determined that the up-sampling resistor R_U is open.

Preferably, the second reference voltage Vref2 may be set to make that: the output voltage Vout is less than a maximum allowable voltage of the output port when the power supply voltage VDD is equal to the second reference voltage Vref2, where the maximum allowable voltage of the output port is a maximum allowable voltage of a capacitance C1 or a load R1 coupled with the output port, whereby the disconnection of the up-sampling resistor R_U can be detected in time, and risk of the output voltage Vout being too high to damage the capacitor C1 or load R1 can be avoided. For example, if the maximum allowable voltages of the capacitor C1 and the load R1 are 6.2V and 10V respectively, then the maximum allowable voltage of the output port is 6.2V. The second reference voltage Vref2 is less than the overvoltage protection threshold VDDOVP (referring to FIG. 2).

The open circuit protection module 203 is configured to generate an open circuit protection signal FAULT, when the first comparison result FB_IN indicates that the first divided voltage FB is lower than the first reference voltage Vref1, and the second comparison result OP_EN indicates that the power supply voltage VDD is higher than the second reference voltage Vref2, that is, when it is determined that the up-sampling resistor R_U is open; and the primary controller 20 stops a control of the primary winding n1 in response to the open circuit protection signal FAULT.

In some embodiments, the open circuit protection signal FAULT may be a rising edge from a logic low level to a logic high level, but the present invention is not limited hereto. For example, the open circuit protection signal FAULT may also be a falling edge, an active Level, or a signal having a frequency greater than a threshold value, as long as the open circuit protection signal FAULT can be identified by the primary controller 20.

In some embodiments, in response to the open circuit protection signal FAULT, the primary controller 20 may stop control of the primary winding n1 by stopping generation of the PWM signal or by controlling a duty ratio of the PWM signal to be 100% or 0%.

Further, in the present disclosure, the disconnection of the up-sampling resistor is determined based on two criteria, i.e., that the first divided voltage FB is lower than the first reference voltage Vref1 and that the power supply voltage VDD is higher than the second reference voltage Vref2, which are not prone to a false judgment and the detection method is more effective, therefore the open circuit protection can be provided more effectively to the switching power supply.

Figure 7:
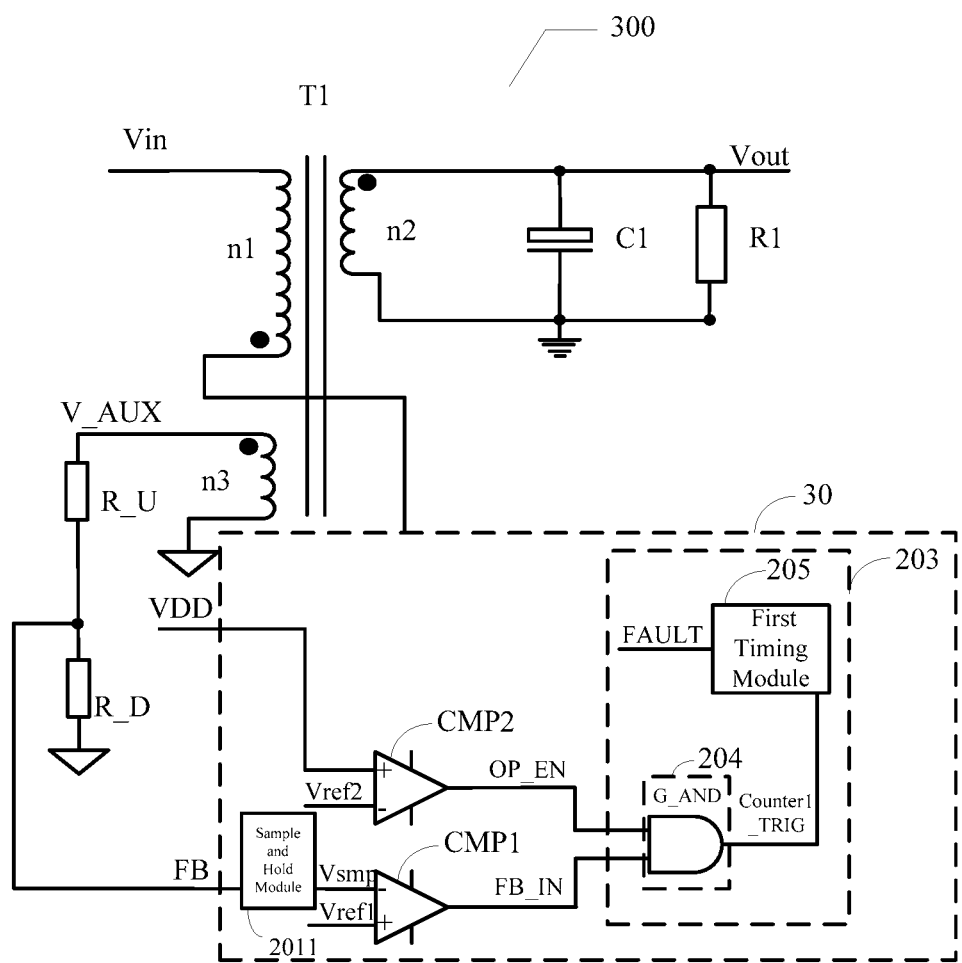
FIG. 7 schematically illustrates a structural block diagram of a switching power supply according to a second embodiment of the present disclosure.

Referring to FIG. 7, FIG. 7 schematically illustrates a switching power supply 300 according to a second embodiment of the present disclosure. The switching power supply 300 is similar in structure and operating principle to the switching power supply 200 in the first embodiment of the present disclosure. The main difference between the second embodiment and the first embodiment lies in that, in the primary controller 30 of the present embodiment, the open circuit protection module 203 may include a logic module 204 and a first timing module 205.

Further, the logic module 204 has a first input terminal input with the first comparison result FB_IN and a second input terminal input with the second comparison result OP_EN, and the logic module 204 is configured to generate a logic signal Counter1_TRIG when the first comparison result FB_IN indicates that the first divided voltage FB is lower than the first reference voltage Vref1, and the second comparison result OP_EN indicates that the power supply voltage VDD is higher than the second reference voltage Vref2.

As a non-limiting example, when the first divided voltage FB is less than the first reference voltage Vref1, the first comparison result FB_IN may be a logic high level; and when the power supply voltage VDD is greater than the second reference voltage Vref2, the second comparison result OP_EN may be a logic high level. Where the logic module 204 may include an AND gate G_AND. Specifically, the AND gate G_AND has a first input terminal input with the first comparison result FB_IN, a second input terminal input with the second comparison result OP_EN, and an output terminal outputting the logic signal Counter1_TRIG.

In a variation of the present embodiment, when the first divided voltage FB is less than the first reference voltage Vref1, the first comparison result FB_IN may be a logic low level; and when the power supply voltage VDD is greater than the second reference voltage Vref2, the second comparison result OP_EN may be a logic low level. Where the logic module 204 may include an OR gate (not shown). Specifically, the OR gate has a first input terminal input with the first comparison result FB_IN, a second input terminal input with the second comparison result OP_EN, and an output terminal outputting the logic signal Counter1_TRIG.

It will be understood by those skilled in the art that, the logic module may be configured with a variety of embodiments when its input and output truth tables are known, which will not be described in detail herein.

The first timing module 205 is configured to: start timing under a control of the logic signal Counter1_TRIG, for example, the first timing module 205 may start timing when the logic signal Counter1_TRIG is a logic high level, stop timing when the logic signal Counter1_TRIG is a logic low level, and generate the open circuit protection signal FAULT when the timing lasts for a period greater than or equal to a first time length T1. In some embodiments, the first timing module 205 may be a counter circuit or a device having a timing function.

Further, in the present embodiment, it is determined that the up-sampling resistor R_U is open if and only if the first divided voltage FB is lower than the first reference voltage Vref1, the power supply voltage VDD is higher than the second reference voltage Vref2 and the timing lasts for at least a first time length T1, which is beneficial to filter out signal burrs caused by the power supply voltage VDD being accidentally too high or the first divided voltage FB being accidentally too low, so as to avoid a misjudgment.

For more information of the present embodiment, reference can be made to the foregoing description of the first embodiment, which will not be described in detail herein.

Figure 8:
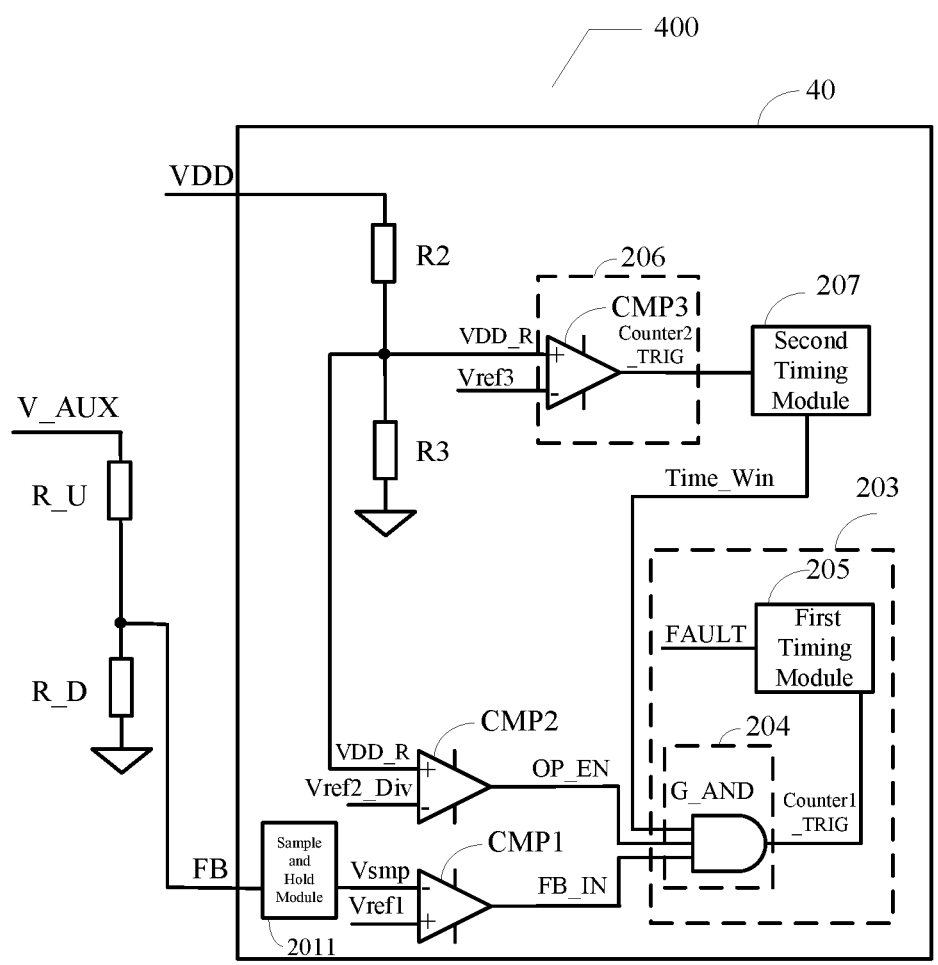
FIG. 8 schematically illustrates a structural block diagram of a switching power supply according to a third embodiment of the present disclosure.

Referring to FIG. 8, FIG. 8 schematically illustrates a switching power supply 400 according to a third embodiment of the present disclosure, and the switching power supply 400 is similar in structure and operation principle to the switching power supply 200 in the first embodiment of the present disclosure. The main difference between the third embodiment and the first embodiment lies in that, in a primary control 40 of the present embodiment, a second comparison module may include a second voltage divider circuit (not shown) and a second comparator CMP2. For simplicity, FIG. 8 omits other portions of the switching power supply 400 other than the primary controller 40.

The second voltage divider circuit is configured to divide the power supply voltage VDD to obtain a second divided voltage VDD_R. The second voltage divider circuit may include voltage dividing resistors R2 and R3, and structures of the second voltage divider circuit may refer to the foregoing description of the first voltage divider circuit, which will not be described in detail herein.

The second comparator CMP2 is configured to compare the second divided voltage VDD_R with a reference divider voltage Vref2_Div to obtain a second comparison result OP_EN, where the reference divider voltage Vref2_Div is equal to the second reference voltage multiplied by a voltage division ratio of the second voltage divider circuit.

Preferably, a potential of the power supply voltage VDD when the second divided voltage VDD_R is equal to the reference divider voltage Vref2_Div is larger than a potential of the power supply voltage VDD when the first divided voltage FB is equal to the first reference voltage Vref1.

Further, the primary controller 40 may further include a third comparison module 206 and a second timing module 207.

The third comparison module 206 is configured to compare the second divided voltage VDD_R with a third reference voltage Vref3 to obtain a third comparison result Counter2_TRIG. In some embodiments, the third comparison module 206 may be similar in structure to the first comparison module 201 and the second comparison module 202 in the first embodiment of the present invention, which will not be described in detail herein. In the present embodiment, the third comparison module 206 including a third comparator CMP3 is taken as an example for illustration.

The third reference voltage Vref3 is less than the reference divider voltage Vref2_Div. That is, when a potential of the power supply voltage VDD increases, the second divided voltage VDD_R makes the third comparison result Counter2_TRIG of the third comparison module 206 flip over earlier compared with the second comparison module 202.

When the second divided voltage VDD_R exceeds the third reference voltage Vref3, it indicates that the switching power supply 400 has passed a startup phase and entered a normal operating state.

The second timing module 207 is input with the third comparison result Counter2_TRIG, and is configured to start timing when the third comparison result Counter2_TRIG indicates that the second divided voltage VDD_R is greater than the third reference voltage Vref3, for example, the third comparison result Counter2_TRIG is a logic high level; and the second timing module 207 is further configured to stop timing when the timing lasts for a second time length T2 so as to generate a time window signal Time_Win.

Further, the open circuit protection module 203 may include a logic module 204 and a first timing module 205.

The logic module 204 has a first input terminal input with the first comparison result FB_IN, a second input terminal input with the second comparison result OP_EN, and a third input terminal input with the time window signal Time_Win, and the logic module 204 is configured to generate a logic signal Counter1_TRI in a time window defined by the time window signal Time_Win, when the first comparison result FB_IN indicates that the first divided voltage FB is lower than the first reference voltage Vref1, and the second comparison result OP_EN indicates that the second divided voltage VDD_R is higher than the reference divider voltage Vref2_Div.

The first timing module 205 is configured to start timing under a control of the logic signal Counter1_TRI, and to generate an open circuit protection signal FAULT when the timing lasts for a period greater than or equal to a first time length T1.

In some embodiments, when the first divided voltage FB is less than the first reference voltage Vref1, the first comparison result FB_IN may be a logic high level, and when the second divided voltage VDD_R is greater than the reference divider voltage Vref2_Div, the second comparison result OP_EN may be a logic high level, and the time window signal Time_Win may be a logic high level during the timing of the second timing module 207. The logic module 204 may include an AND gate G_AND. Specifically, the AND gate G_AND has a first input terminal input with the first comparison result FB, a second input terminal input with the second comparison result OP_EN, a third input terminal input with the time window signal Time_Win, and an output terminal outputting the logic signal Counter1_TRIG.

Further, in the present embodiment, it is determined that the up-sampling resistor is open if and only if the first divided voltage FB is lower than the first reference voltage Vref1, the power supply voltage VDD is higher than the second reference voltage Vref2 and the timing lasts for at least a first time length T1, so as to avoid misjudgment. In addition, the above detection is performed when the switching power source 400 has just entered a normal operation state, and the detection only occurs within the second time length T2, which can facilitate saving power consumption of the switching power supply 400.

For more information of the present embodiment, reference can be made to the foregoing descriptions of the first and second embodiments, which will not be described in detail herein.

Figure 9:
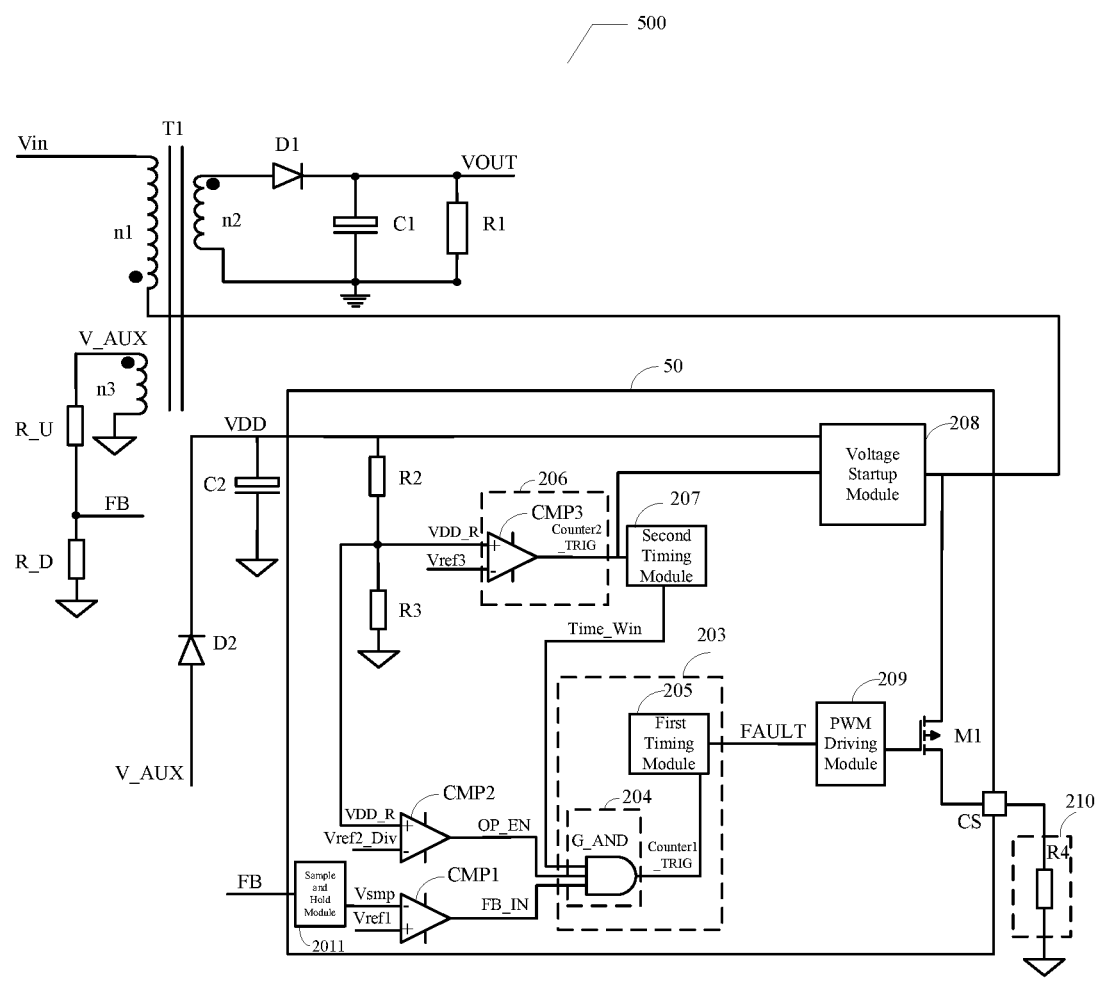
FIG. 9 schematically illustrates a structural block diagram of a switching power supply according to a fourth embodiment of the present disclosure.

Referring to FIG. 9, FIG. 9 schematically illustrates a switching power supply 500 according to a fourth embodiment of the present disclosure, and structure and operation principle of the switching power supply 500 are similar to those of the switching power supply 400 in the third embodiment of the present disclosure. The main difference between the fourth embodiment and the third embodiment lies in that, the primary controller 50 in the present disclosure may also include a high voltage startup module 208.

Where the high voltage startup module 208 has a control terminal input with the third comparison result Counter2_TRIG, and an output terminal 208 coupled with the power supply port. The high voltage startup module 208 charges the power supply port, when the third comparison result Counter2_TRIG indicates that the second divided voltage VDD_R is less than or equal to the third reference voltage Vref3; and the high voltage startup module 208 stops charging the power supply port, when the third comparison result Counter2_TRIG indicates that the second divided voltage VDD_R is greater than the third reference voltage Vref3.

Further, the primary controller 50 may further include a Pulse Width Modulation (PWM) driving module 209 and a power switch transistor M1. Where the PWM driving module 209 is configured to improve a drive capability of the PWM signal generated by the primary controller 50, a control terminal of the PWM driving module 209 may be input with the open circuit protection signal FAULT; and a gate of the power switch transistor M1 is coupled with an output terminal of the PWM driving module 209, for example, the power switch transistor M1 may be an NMOS transistor, a drain of the power switch transistor M1 may be coupled with the primary winding n1, and a source of the power switch transistor M1 may be coupled with a current sampling port CS, where the current sampling port CS is coupled with a current sampling module 210 of the switching power supply 500, and the current sampling module 210 may include a sampling resistor R4.

Further, the switching power supply 500 may further include: a freewheeling diode D1 coupled between the secondary winding n2 and the output port; a second diode D2 having a positive electrode input with a feedback voltage V_AUX and a negative electrode coupled with a power supply port; and a second capacitor C2 having one end coupled with the power supply port and the other end grounded.

Figure 10:
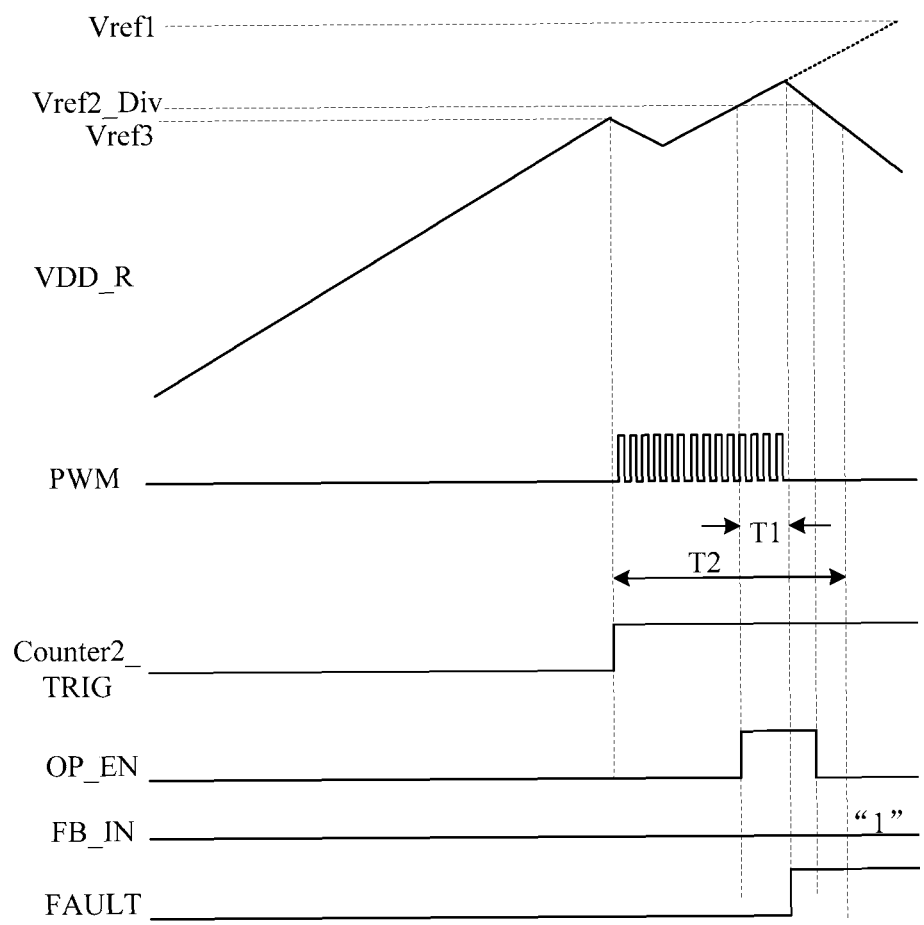
FIG. 10 schematically illustrates a work waveform diagram of the switching power supply according to the fourth embodiment of the present disclosure.
Figure 11:
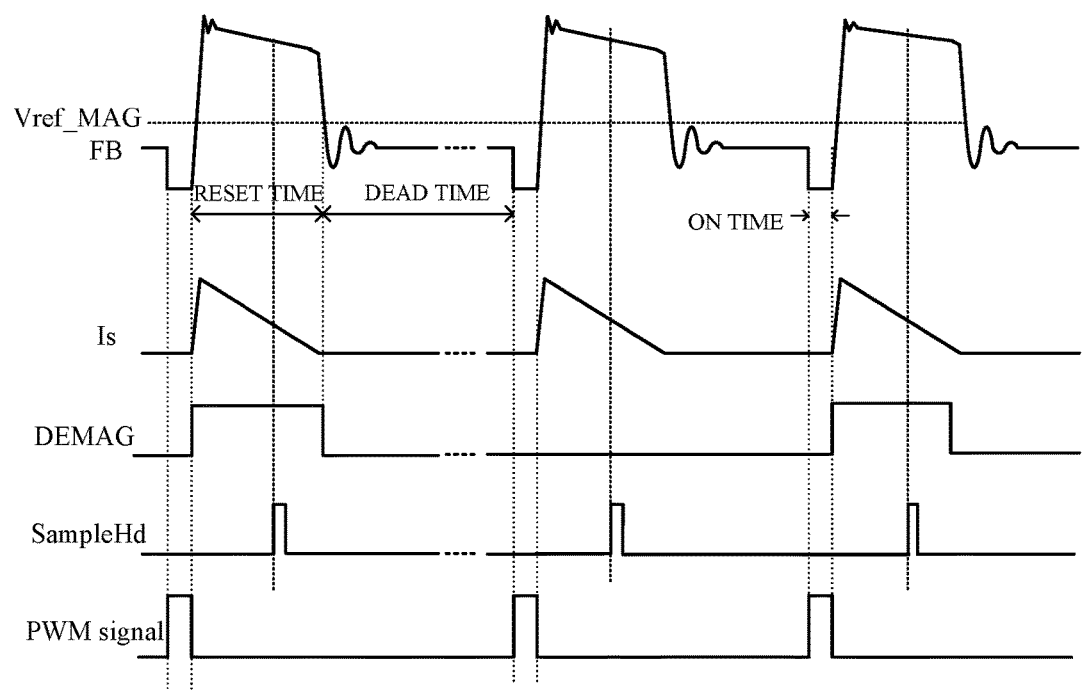
FIG. 11 schematically illustrates another work waveform diagram of the switching power supply according to the fourth embodiment of the present disclosure.

FIGS. 10 and 11 respectively illustrate a work waveform diagram of the switching power supply 500 according to the fourth embodiment of the present disclosure. In the following, "1" will be applied to denote a logic high level and "0" will be applied to denote a logic low level.

Referring to FIG. 9 in conjunction with FIGS. 10 and 11, when the switching power supply 500 starts up, the second divided voltage VDD_R is less than the third reference voltage Vref3, the high voltage startup module 208 charges the power supply port, the second capacitor C2 accumulates charge, so that a potential value of the power supply voltage VDD increases until the second divided voltage VDD_R is up to the third reference voltage Vref3, whereby startup of the switching power supply 500 is completed. During this period, the first comparison result FB_IN, the second comparison result OP_EN and the third comparison result Counter2_TRIG are all "0".

After startup, the switching power supply 500 enters a normal operation state, and the primary controller 50 generates a PWM signal. During this period, the second divided voltage VDD_R is greater than or equal to the third reference voltage Vref3, the third comparison result Counter2_TRIG closes the high voltage startup module 208, the power supply port is intermittently charged by the feedback voltage V_AUX, and the second diode D2 is intermittently turned on, which may refer to a work waveform of the second divided voltage VDD_R. Specifically, when the PWM signal is "1", the power switch transistor M1 is turned on, and the primary winding n1 stores power, which corresponds to an ON TIME stage in FIG. 11; when the PWM signal is "0", the power switch transistor M1 is turned off, an alternating current is generated on the primary winding n1, the secondary winding n2 may sense the current and the freewheeling diode D1 is turned on, then a potential value of the output voltage Vout, a potential of the feedback voltage V_AUX and a potential of the first divided voltage FB all increase; and the primary controller 50 determines a demagnetization time RESET TIME of the secondary winding n2 to form a demagnetization signal DEMAG based on a comparison result of the first divided voltage FB and the reference voltage, during this stage, a waveform of the sampling current Is rises first and then falls, but always makes the freewheeling diode D1 turned on; and then the work waveform of the switching power supply 500 enters a DEAD TIME stage as shown in FIG. 11, where a duration of the DEAD TIME stage starts from the sampling current Is is zero, the freewheeling diode D1 is turned off until the ON TIME stage is entered. In addition, during the demagnetization time RESET TIME, the primary controller 50 may generate a sample and hold signal SampleHD and control the sample and hold module 2011 to sample and hold the first divided voltage FB at a leading edge of the sample and hold signal SampleHD. The above processes will be repeated in a next cycle of the PWM signal.

After the switching power supply 500 starts up, disconnection detection of the up-sampling resistor R_U begins. When the up-sampling resistor R_U is open, the potential of the power supply voltage VDD may reflect the potential of the output voltage Vout to a certain extent. Specifically, when the second divided voltage VDD_R is greater than or equal to the third reference voltage Vref3, the third comparison result COUNTER2_TRIG is cleared and the second timing module 207 is started, and during the timing of the second timing module 207, a time window signal TIME_WIN output by the second timing module 207 is "1", and a second time length T2 is set so that when the timing lasts for the T2, the timing is stopped. If the up-sampling resistor R_U is open, then the first divided voltage FB will be lower than the first reference voltage Vref1, making that the first comparison result FB_IN change from "0" to "1", and the power supply voltage VDD will be higher than the second reference voltage Vref2, that is, the second divided voltage VDD_R will be higher than the reference divider voltage Vref2_Div, the second comparison result OP_EN will change from "0" to "1", then the logic signal Counter1_TRIG output from the AND gate G_AND is "1", the second comparison result is cleared and the first timing module 205 starts timing, when the timing of the first timing module lasts for a first time length T1, it can be determined that the abnormality is not caused by signal burrs and the up-sampling resistor R_U is open, and an open circuit protection signal FAULT of "1" is generated. Where the open circuit protection signal FAULT controls the PWM driving module 209 to stop outputting the PWM signal, so as to provide an open circuit protection to the switching power supply 500.

For more information of the present embodiment, references may be made to the foregoing descriptions of the first, second and third embodiments, which will not be described in detail herein.

It should be noted that, the high voltage startup module 208, the PWM driving module 209, and the power switch transistor M1 may also be independent of the primary control in the embodiments of the present disclosure.

It should be noted that, the "logic high level" and "logic low level" in the present disclosure are relative logic levels. Where the "logic high level" refers to a level range that can be identified as a digital signal "1", and the "logic low level" refers to a level range that can be identified as a digital signal "0". The present disclosure imposes no restriction on the specific level range.

Although the present disclosure is disclosed as above, the present disclosure is not limited thereto. Any person skilled in the art will be able to make various modifications and variations without departing from the spirit and scope of the disclosure, and the scope of the disclosure is therefore intended to be within the scope of the claims.

The invention claimed is:

1. A switching power supply, comprising:
an output port, configured to generate an output voltage;
a transformer, comprising a primary winding configured to receive an input signal directly or indirectly, and a secondary winding of the transformer coupled with the output port;
a first voltage divider circuit, configured to divide a feedback voltage to obtain a first divided voltage, the feedback voltage being correlated with the output voltage; and
a primary controller, configured to control a current of the primary winding of the transformer, the primary controller having a feedback port and a power supply port, the feedback port being configured to be input with the first divided voltage, the power supply port being configured to be input with a power supply voltage;
wherein, the primary controller comprises:
a first comparison module, configured to compare the first divided voltage with a first reference voltage to obtain a first comparison result;
a second comparison module, configured to compare the power supply voltage with a second reference voltage to obtain a second comparison result; and
an open circuit protection module, configured to generate an open circuit protection signal, when the first comparison result indicates that the first divided voltage is lower than the first reference voltage, and the second comparison result indicates that the power supply voltage is higher than the second reference voltage, where the primary controller is configured to stop a control of the primary winding in response to the open circuit protection signal.

2. The switching power supply according to claim 1, wherein the transformer has an auxiliary winding, and the auxiliary winding outputs the feedback voltage; and the first reference voltage is smaller than a constant voltage reference value, and the constant voltage reference value is equal to a product of a turns ratio of the auxiliary winding and the secondary winding, a rated output voltage of the switching power supply and a voltage division ratio of the first voltage divider circuit.

3. The switching power supply according to claim 1, wherein the first comparison module comprises:
a sample and hold module, configured to sample and hold the first divided voltage within a demagnetization time of the secondary winding to obtain a sampling voltage; and
a first comparator, coupled with the sample and hold module, and configured to compare the sampling voltage with the first reference voltage to obtain the first comparison result.

4. The switching power supply according to claim 1, wherein the open circuit protection module comprises:
a logic module, having a first input terminal input with the first comparison result and a second input terminal input with the second comparison result, the logic module being configured to generate a logic signal when the first comparison result indicates that the first divided voltage is lower than the first reference voltage, and the second comparison result indicates that the power supply voltage is higher than the second reference voltage; and a first timing module, configured to start timing under a control of the logic signal and to generate the open circuit protection signal when the timing lasts for a period greater than or equal to a first time length.

5. The switching power supply according to claim 4, wherein the first comparison result is a logic high level when the first divided voltage is less than the first reference voltage, and the second comparison result is a logic high level when the power supply voltage is greater than the second reference voltage; and
the logic module comprises an AND gate, where the AND gate has a first input terminal input with the first comparison result, a second input terminal input with the second comparison result, and an output terminal outputting the logic signal.

6. The switching power supply according to claim 1, wherein the second comparison module comprises:
a second voltage divider circuit, configured to divide the power supply voltage to obtain a second divided voltage; and
a second comparator, configured to compare the second divided voltage with a reference divider voltage to obtain the second comparison result, where the reference divider voltage is equal to the second reference voltage multiplied by a voltage division ratio of the second voltage divider circuit.

7. The switching power supply according to claim 6, wherein the primary controller further comprises:
a third comparison module, configured to compare the second divided voltage with a third reference voltage to obtain a third comparison result, where the third reference voltage is less than the reference divider voltage; and
a second timing module, input with the third comparison result, and configured to start timing when the third comparison result indicates that the second divided voltage is greater than the third reference voltage, and stop timing when the timing lasts for a period of a second time length so as to generate a time window signal; and
the open circuit protection module comprises:
a logic module, having a first input terminal input with the first comparison result, a second input terminal input with the second comparison result, and a third input terminal input with the time window signal, where the third input terminal is configured to generate a logic signal in a time window defined by the time window signal, when the first comparison result indicates that the first divided voltage is lower than the first reference voltage, and the second comparison result indicates that the second divided voltage is higher than the reference divider voltage; and
a first timing module, configured to start timing under a control of the logic signal, and to generate the open circuit protection signal when the timing lasts for a period greater than or equal to a first time length.

8. The switching power supply according to claim 7, wherein the primary controller further comprises:
a high voltage startup module, having a control terminal input with the third comparison result, and an output terminal coupled with a power supply port, where the high voltage startup module is configured to charge the power supply port, when the third comparison result indicates that the second divided voltage is less than or equal to the third reference voltage, and the high voltage startup module is configured to stop charging the power supply port, when the third comparison result indicates that the second divided voltage is greater than the third reference voltage.

9. The switching power supply according to claim 7, wherein the first comparison result is a logic high level when the first divided voltage is less than the first reference voltage, the second comparison result is a logic high level when the second divided voltage is greater than the reference divider voltage, and the time window signal is a logic high level during the timing of the second timing module; and the logic module comprises an AND gate, where the AND gate has a first input terminal input with the first comparison result, a second input terminal input with the second comparison result, a third input terminal input with the time window signal, and an output terminal outputting the logic signal.

10. The switching power supply according to claim 1, wherein the second reference voltage is set to make that: the output voltage is less than a maximum allowable voltage of the output port when the power supply voltage is equal to the second reference voltage, where the maximum allowable voltage of the output port is a maximum allowable voltage of a capacitance or a load coupled with the output port.

* * * * *